(12) United States Patent
Veloso et al.

(10) Patent No.: US 9,314,904 B2
(45) Date of Patent: Apr. 19, 2016

(54) METHOD FOR ATTACHING A PHOTOVOLTAIC PANEL

(71) Applicants: Manuel Veloso, Hem (FR); Alexis Gaveau, Hem (FR)

(72) Inventors: Manuel Veloso, Hem (FR); Alexis Gaveau, Hem (FR)

(73) Assignee: CIEL ET TERRE INTERNATIONAL, Hellemmes-Lille (FR)

( * ) Notice: Subject to any disclaimer, the term of this patent is extended or adjusted under 35 U.S.C. 154(b) by 0 days.

(21) Appl. No.: 14/387,564

(22) PCT Filed: Apr. 10, 2013

(86) PCT No.: PCT/FR2013/050779
§ 371 (c)(1),
(2) Date: Sep. 24, 2014

(87) PCT Pub. No.: WO2013/153329
PCT Pub. Date: Oct. 17, 2013

(65) Prior Publication Data
US 2015/0075587 A1    Mar. 19, 2015

(30) Foreign Application Priority Data

Apr. 10, 2012  (FR) ...................................... 12 53252

(51) Int. Cl.
*E04D 13/18*    (2014.01)
*B25B 5/14*    (2006.01)
(Continued)

(52) U.S. Cl.
CPC ................ *B25B 5/145* (2013.01); *F24J 2/526* (2013.01); *F24J 2/5237* (2013.01); *F24J 2/5239* (2013.01);
(Continued)

(58) Field of Classification Search
CPC ....... F24J 2/5245; F24J 2/5254; F24J 2/5252; F24J 2/5256; F24J 2002/5224; F24J 2002/4663; E04D 1/34; B25B 5/145; H02S 20/23; Y02E 10/47
See application file for complete search history.

(56) References Cited

U.S. PATENT DOCUMENTS 6,111,189 A * 8/2000 Garvison et al. ............... 136/244
2003/0201009 A1 * 10/2003 Nakajima et al. ............. 136/251
(Continued)

FOREIGN PATENT DOCUMENTS

DE   20 2010 001518      4/2010
DE   10 2009 019548     11/2010
(Continued)

OTHER PUBLICATIONS

International Search Report dated Jul. 3, 2013, corresponding to PCT/FR2013/050779.

*Primary Examiner* — Brian Glessner
*Assistant Examiner* — Gisele Ford
(74) *Attorney, Agent, or Firm* — Young & Thompson (57) ABSTRACT

A device (1) for attaching a framed or unframed photovoltaic panel (P), includes holding members (2) capable of holding a photovoltaic panel by engaging with two parallel edges of the photovoltaic panel or indeed two parallel wings of the frame of the photovoltaic panel. The device includes the holding members including elements (3-6) engaging with the two parallel edges of the photovoltaic panel, or indeed with the two parallel wings of the frame of the photovoltaic panel, each element having a slot (7) intended to receive a wing of the frame of a framed photovoltaic panel, or indeed to receive the edge of an unframed photovoltaic panel, in such a way as to ensure the photovoltaic panel is blocked at least in the direction perpendicular to the photovoltaic panel and in a direction parallel to the plane of the photovoltaic panel and perpendicular to the axis of the slots.

5 Claims, 10 Drawing Sheets

(51) Int. Cl.
*F24J 2/52* (2006.01)
*H01L 31/042* (2014.01)
*H02S 20/23* (2014.01)
*H02S 30/10* (2014.01)

(52) U.S. Cl.
CPC .............. *F24J 2/5243* (2013.01); *F24J 2/5249* (2013.01); *F24J 2/5254* (2013.01); *H02S 20/00* (2013.01); *H02S 20/23* (2014.12); *H02S 30/10* (2014.12); *F24J 2002/5281* (2013.01); *Y02B 10/12* (2013.01); *Y02B 10/20* (2013.01); *Y02E 10/47* (2013.01); *Y02E 10/50* (2013.01); *Y10T 29/49826* (2015.01)

(56) References Cited

U.S. PATENT DOCUMENTS

| | | | |
|---|---|---|---|
| 2009/0272062 A1* | 11/2009 | Gibbs | 52/543 |
| 2010/0059641 A1* | 3/2010 | Twesme et al. | 248/205.3 |
| 2010/0089390 A1* | 4/2010 | Miros et al. | 126/608 |
| 2011/0068244 A1* | 3/2011 | Hartelius et al. | 248/298.1 |
| 2011/0209422 A1* | 9/2011 | King et al. | 52/173.3 |
| 2012/0079781 A1* | 4/2012 | Koller | 52/173.3 |

FOREIGN PATENT DOCUMENTS

| | | |
|---|---|---|
| EP | 1 070 923 | 1/2001 |
| WO | 2006/086808 | 8/2006 |
| WO | 2011/019460 | 2/2011 |

\* cited by examiner

METHOD FOR ATTACHING A PHOTOVOLTAIC PANEL

The invention relates to a device for attaching a framed or unframed photovoltaic panel, able to maintain a photovoltaic panel on two of the edges of said photovoltaic panel, or on its frame.

The field of the invention is that of installing and attaching photovoltaic panels, in particular on a frame, such as for example on a roof, or for example, on a floating system of a floating solar power station.

A photovoltaic panel, very often, is provided with an aluminium frame and it is known to attach the panel thanks to a system of clamps, machined metal parts, each engaging with a wing of the panel.

The clamping of the frame is obtained by the tightening of the jaws of the clamp, conventionally by screwing.

In order to be able to take into account the various dimensions of photovoltaic panels, it is moreover known to provide a rail along which two of the clamps can be displaced, then be attached in adjustable positions in order to maintain two edges of the frame of the panel.

Such an attaching technique is, for example, disclosed by document DE 102009019548A1 which describes a support module that has a particular application for the installation of a photovoltaic panel on a horizontal surface roof. This module comprises a thermoformed plastic shell provided on its upper portion with a system of clamps with adjustable positions. This system comprises a rail inside of which two clamps can be displaced. The blocking of the clamps in attached positions in the rail is obtained by tightening a locking screw. Each of the clamps is able to engage with the aluminium frame of a panel, with the tightening also obtained by screwing.

Such a technique of attaching, which requires machined metal parts, is however of substantial cost price. Moreover, it requires the tightening of many screws in order to provide for the adjusting of the positions of the clamps, according to the dimensions of the panel, then the clamping of the photovoltaic panel.

The purpose of this invention is to overcome the aforementioned disadvantages by proposing a device for attaching a photovoltaic panel of which the implementation is facilitated and of very low cost price in comparison with devices for attaching of prior art.

Another purpose of this invention is to propose such a device for attaching which does not require any tools for the attaching of the photovoltaic panel, or for the attaching of the device onto its installation support.

Another purpose of this invention is to propose such a device for attaching which makes it possible to attach different dimensions of photovoltaic panels.

Other purposes and advantages shall appear in the description which is provided solely for the purposes of information and which does not have for purpose to limit it.

Also, the invention relates to a device for attaching a framed or unframed photovoltaic panel, comprising means for maintaining, able to maintain a photovoltaic panel by engaging with two parallel edges of said photovoltaic panel, or, with two parallel wings of the frame of the photovoltaic panel, said means for maintaining comprising elements engaging with the two parallel edges of said photovoltaic panel, or, with two parallel wings of the frame of the photovoltaic panel, each element having a slot intended to receive a wing of the frame of a framed photovoltaic panel, or receive the edge of an unframed photovoltaic panel, in such a way as to provide for the blocking of the photovoltaic panel at least according to the direction perpendicular to the photovoltaic panel and according to a direction parallel to the plane of the photovoltaic panel and perpendicular to the axis of the slots.

According to the invention, the elements are each made of elastomer, at least on the slot, with the blocking of the photovoltaic panel according to the axis of the slots being provided solely thanks to the creation of an elastic clamping and to the friction between, on the one hand, the elastomeric material of said elements and, on the other hand, the unframed photovoltaic panel, or the frame of the framed photovoltaic panel.

Advantageously the means for maintaining are arranged in such a way as to engage solely with two of the opposite edges of the photovoltaic panel or of its frame and in such a way that the photovoltaic panel can be provided as extending beyond said means for maintaining according to the axis of the slots.

According to optional characteristics of the invention taken individually or in combination:
- the elements each include, in addition to said slot, a fixing groove, able to allow for the attaching of said element to a support that has a complementary rib intended to be inserted into said fixing groove;
- the axis of the slot and the axis of the fixing groove are parallel to each other;
- the fixing groove has a T-shaped section;
- the slots of the elements are mutually facing each other, inwards, in order to allow for the maintaining of an unframed photovoltaic panel on two parallel edges of the photovoltaic panel, or alternatively;
- the slots of the elements are turned outwards in order to allow for the maintaining of the frame of a framed photovoltaic panel on two parallel wings of the frame;
- at least one, or each of the elements takes the form of a synthetic profile, said slot of said element for maintaining being longitudinal to said profile;
- the profile has, on a side opposite that of the slot, a groove intended for passing a cable, formed between the body of said element for maintaining and a flexible wing of said synthetic element;
- the or each element takes the form of a profile, of a single part made of elastomer;
- the elements for maintaining are synthetic elements.

The invention further relates to a method for manufacturing a device for attaching in accordance with the invention wherein said profile made of synthetic material is obtained by extrusion or coextrusion of one or several plastic materials.

According to another embodiment, the or each element of the means for maintaining comprise a profile in particular made of metal, and an elastomeric strip, said profile being provided with a channel, open laterally, receiving said elastomeric strip, said channel provided with said elastomeric strip constituting the slot of said element.

The invention also relates to a method for installing a photovoltaic panel on a support implemented by a device for attaching of which the elements each include a profile and an elastomeric strip.

This method of installation comprises the following steps:
- setting in place of two parallel wings of the frame of the photovoltaic panel in the channels of the profiles of said elements and fastening of the profiles of the elements on the support,
- blocking of the photovoltaic panel in the channels via forced insertion of elastomeric strips into the channels.

The invention also relates to a unit comprising a photovoltaic panel and a device for attaching in accordance with the invention that provides for the maintaining of the photovoltaic panel.

The invention shall be better understood when reading the following description accompanied by annexed figures among which.

Figure 1:
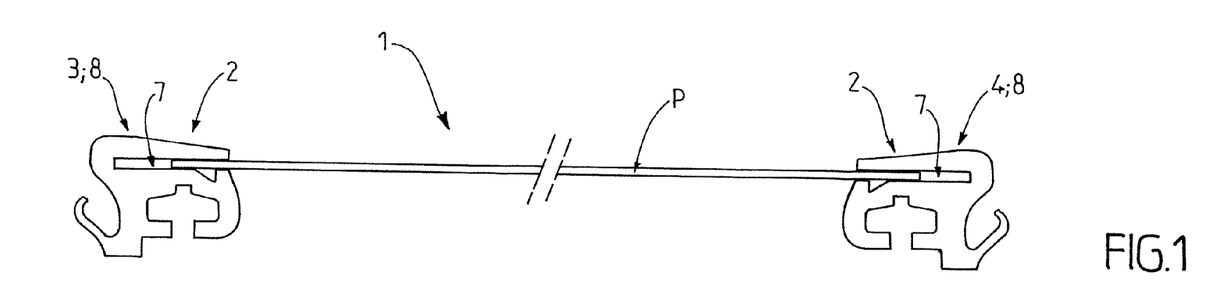
FIG. 1 is a cross-section view of a device for attaching according to an embodiment, according to a first embodiment, with the device directly clamping two opposite edges of an unframed photovoltaic panel.
Figures 2, 2A:
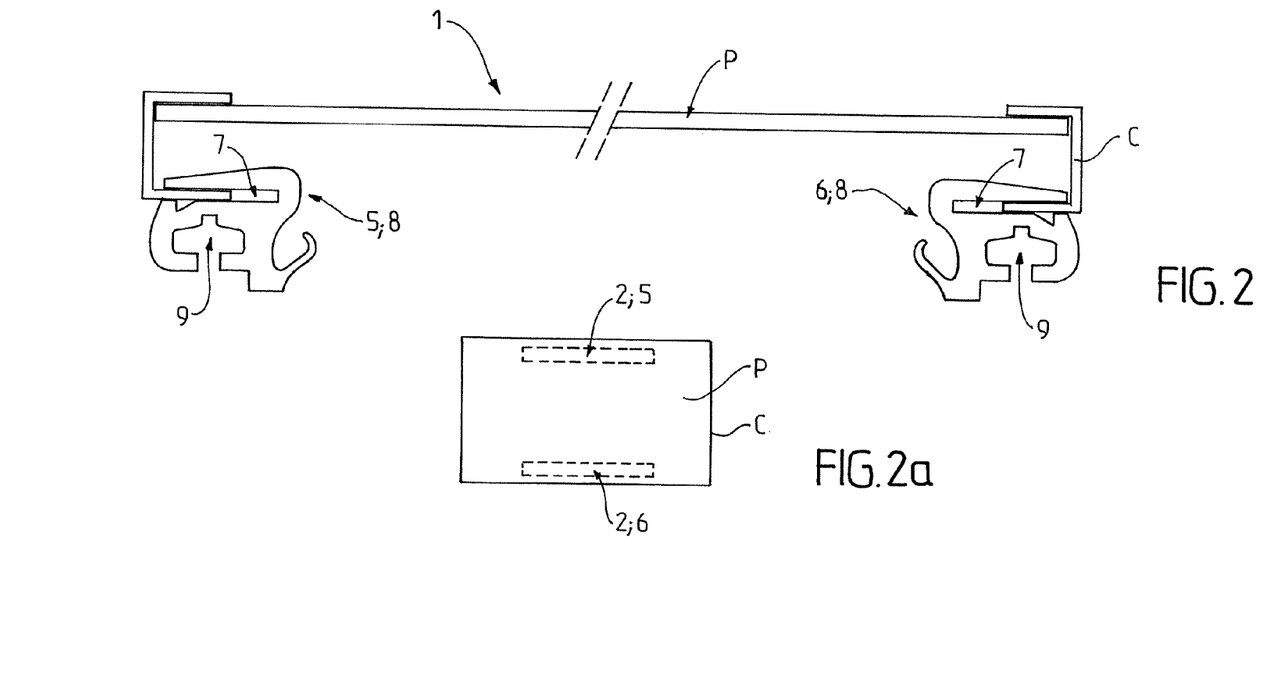
FIG. 2 is a cross-section view of a device for attaching according to a second embodiment, with the device clamping the frame of a framed photovoltaic panel.
FIG. 2a is a top view, of the photovoltaic panel, the device for attaching visible transparently.
Figure 12:
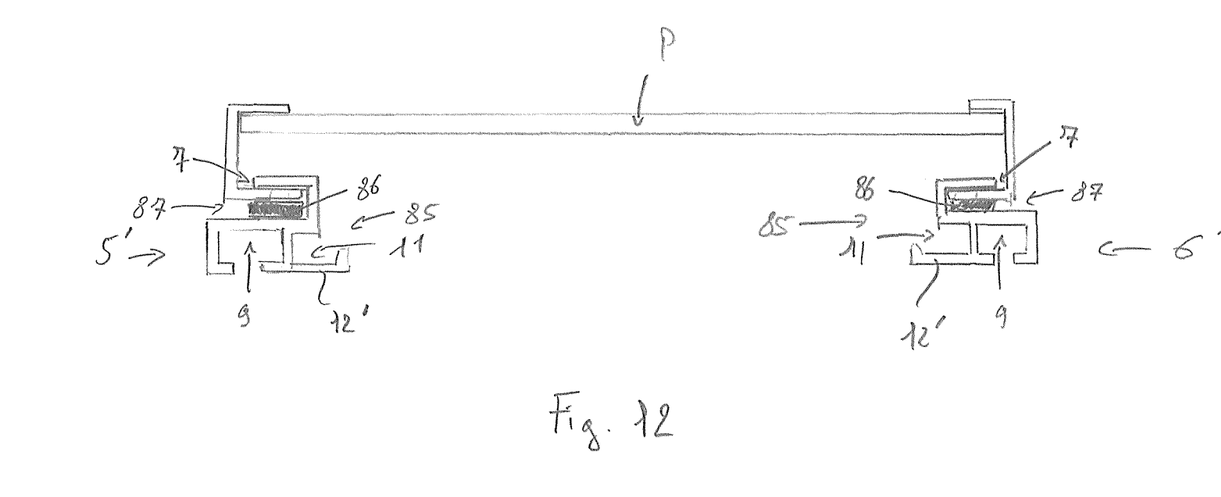
FIG. 12 shows, according to a cross-section view, the maintaining of a photovoltaic panel with a device according to FIG. 9.

Also the invention relates to a device 1 for attaching a framed or unframed photovoltaic panel, comprising means for maintaining 2, able to maintain a photovoltaic panel P by engaging with two parallel edges of said photovoltaic panel P (i.e. FIG. 1), or alternatively, by engaging with two parallel wings of the frame of the photovoltaic panel P (i.e. FIG. 2 or FIG. 12).

According to the invention, said means for maintaining 2 include elements 3, 4; 5, 6; 5', 6', in particular synthetic, engaging with the two parallel edges of said photovoltaic panel or with two parallel wings of the frame C of the photovoltaic panel P.

Each of said elements, when constituted of synthetic material, can be obtained by moulding or by extrusion of a single plastic such as an elastomer, or, by means of several plastics by the techniques of over-moulding or coextrusion.

Each element has a slot 7 intended to receive a wing of the frame C of a framed photovoltaic panel P (i.e. FIG. 2 or FIG. 12), or, alternatively receive the edge of an unframed photovoltaic panel (P) (i.e. FIG. 1).

The attaching of a photovoltaic panel P to the elements for maintaining 3, 4; 5, 6; 5', 6', can be obtained without tools, by inserting the photovoltaic panel (or its frame) into the slots 7 of the means for maintaining 2.

Advantageously, the slots 7 of said elements 3, 4; 5, 6; 5', 6' provide for the blocking of the photovoltaic panel at least according to the direction perpendicular to the photovoltaic panel P and according to a direction parallel to the plane of the photovoltaic panel P and perpendicular to the axis of the slots 7.

According to an embodiment that is not claimed, the blocking of the panel in the third direction of space, namely according to the axis of the slots 7 can be obtained by the intermediary of blocking means, separate from said elements.

According to the invention shown, the elements 3, 4; 5, 6; 5', 6' are each made of elastomer, at least on the slot 7, the blocking of the photovoltaic panel P according to the axis of the slots 7 being provided solely thanks to the creation of an elastic clamping and to the friction between, on the one hand, the elastomeric material of said elements 3, 4; 5, 6; 5', 6' and, on the other hand, the unframed photovoltaic panel P, or the frame C of the framed photovoltaic panel P.

Preferably, the slots 7 of the means for maintaining 2 are contained in the same plane, parallel to the photovoltaic panel P.

According to an embodiment illustrated in FIG. 1, the slots 7 of the elements 3, 4 can be mutually facing each other, inwards, in order to allow for the maintaining of an unframed photovoltaic panel, on two parallel edges of the photovoltaic panel P.

According to another embodiment shown in FIG. 2 or in 12, the slots 7 of the elements 5, 6; 5', 6' are turned outwards in order to allow for the maintaining of the frame C of a framed photovoltaic panel on two parallel wings of the frame C.

More particularly, and according to this latter embodiment, the frame of the panel comprises protruding wings, arranged under the panel, and able to be maintained by the slots 7 of the synthetic elements 5, 6; 5', 6'.

Advantageously, and such as shown in FIG. 2 or in FIG. 12, in this position, the elements 5, 6 are covered, at least partially, by the photovoltaic panel P and its frame C, protecting them from inclement weather and UV radiation.

According to a non-restricted embodiment, at least one, or each of the elements 3, 4; 5, 6, takes the form of a synthetic profile 8, said slot 7 of said element for maintaining being longitudinal to said profile 8. Such a profile 8 can be advantageously obtained by extrusion of a plastic or coextrusion of several plastics. For example, the plastic of the synthetic elements can be a thermoplastic elastomer such as Santoprene™ from the ExxonMobil company or any other commercial equivalent.

More particularly, two profiles 8, in particular parallel to each other, can make it possible to maintain two parallel edges of an unframed photovoltaic panel P, or alternatively two parallel wings of the frame of a framed photovoltaic panel.

In order to facilitate the fastening of the element, in particular synthetic, onto its support, the or each synthetic element 3, 4; 5, 6 can comprise, in addition to said longitudinal slot 7, a fixing groove 9, able to allow for the attaching of said synthetic element to a support having a complementary rib 10.

According to this embodiment, the fastening of said element 8 onto its support can be obtained without any specific tool, simply by inserting the complementary rib 10 of the support into the groove 9 of said synthetic element 3, 4; 5, 6, in particular of the profile 8. Once in place, the maintaining of said synthetic element according to the direction of the rib can be obtained simply thanks to the friction between the synthetic material, in particular elastomeric, of said element in particular synthetic, and the material, in particular plastic, of the complementary rib 10.

The fixing groove 9 can have a T-shaped section, in the shape of a keyhole (disc associated with a trapeze) or any other shape that prohibits the removal by pulling off of said synthetic element 3, 4; 5, 6 from the complementary rib 10.

Preferably, the axis of the fixing groove 9 is parallel to the axis of the slot 7. In the case where said element 3, 4; 5, 6 is a synthetic profile 8, the slot 7 and the fixing groove 9 can be obtained during the same step of extrusion.

According to an embodiment shown, the support 20 can take the form of an element, in particular plastic in particular of a single part, on the upper surface whereon are provided two ribs 10, parallel to each other and separated from one another by a dimension corresponding to a mounting dimension of a photovoltaic panel.

Generally, the spacing between the two complementary ribs 10 is fixed. Different sizes of panels can however be attached to these two ribs 10 by choosing suitable synthetic elements, and in particular suitable profiles 8.

Figure 8:
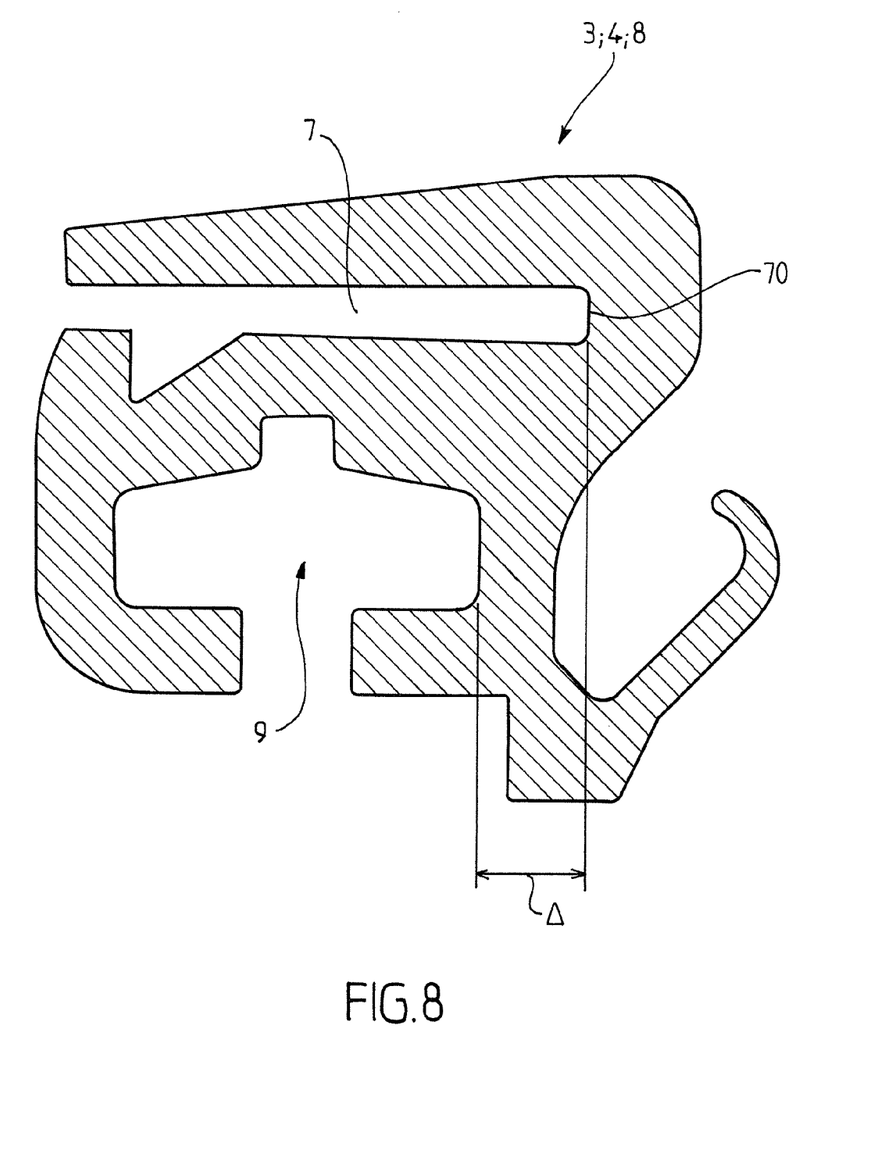
FIG. 8 shows a cross-section view of a profile of a device in accordance with the invention, and more particularly the dimension Δ which can be modified in order to allow for the attaching of photovoltaic panels of different sizes on ribs with a fixed spacing.
Figure 9:
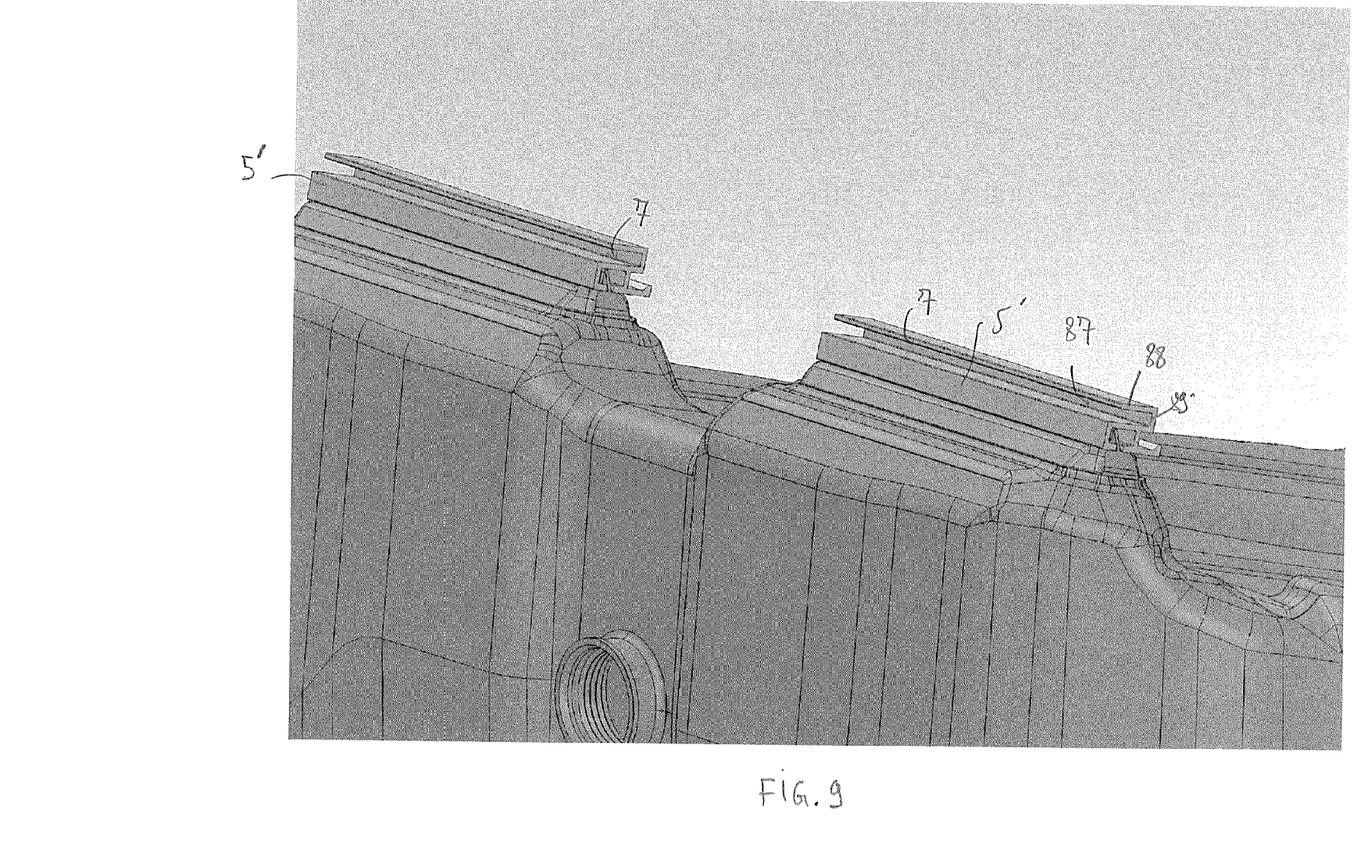
FIG. 9 is a partial view of a second embodiment of the device for attaching in accordance with the invention.
Figure 10:
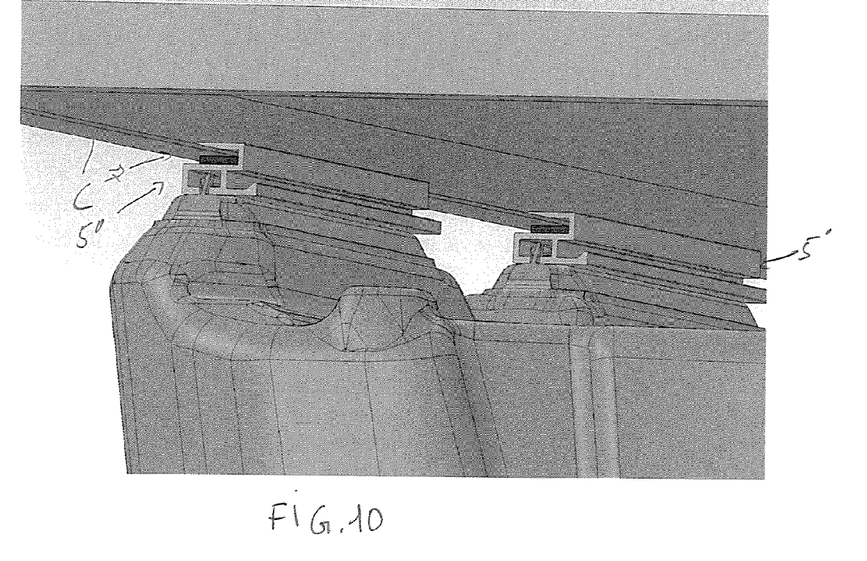
FIG. 10 and FIG. 11 are detailed views showing the attaching of a panel with the device of FIG. 9.
Figure 11:
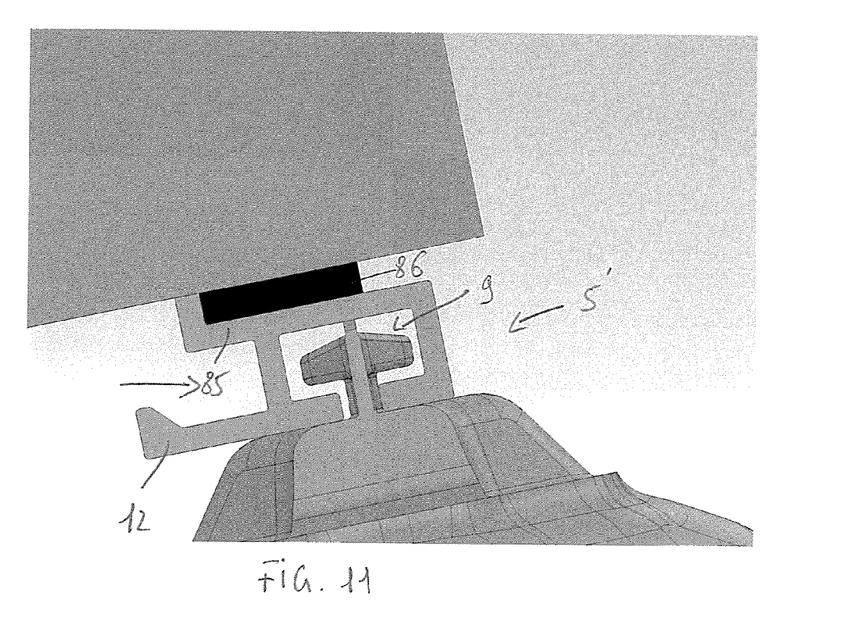

More particularly by acting on the dimension Δ shown in FIG. 8, defined between the bottom 70 of the slot 7 and the fixing groove 9, it is possible to adjust the spacing between the bottoms 70 of the two slots 7 intended to maintain, in particular clamp the two edges of the panel (or of its frame), and as such adapt different sizes of panels, at least cost. Such a modification requires only when said element in particular synthetic is a profile 8, or comprises a profile 85, to have a plurality of extrusion dies, which are inexpensive pieces of production equipment in order to obtain several profiles having separate dimensions Δ.

According to an embodiment, the profile 8 made of synthetic material can have, in particular on the side opposite that of the slot 7, a groove 11 intended for passing an electric cable, said groove being formed between the body 81 of said element for maintaining 3, 4, 5, 6 and a flexible wing 12 of said element for maintaining.

Figure 3:
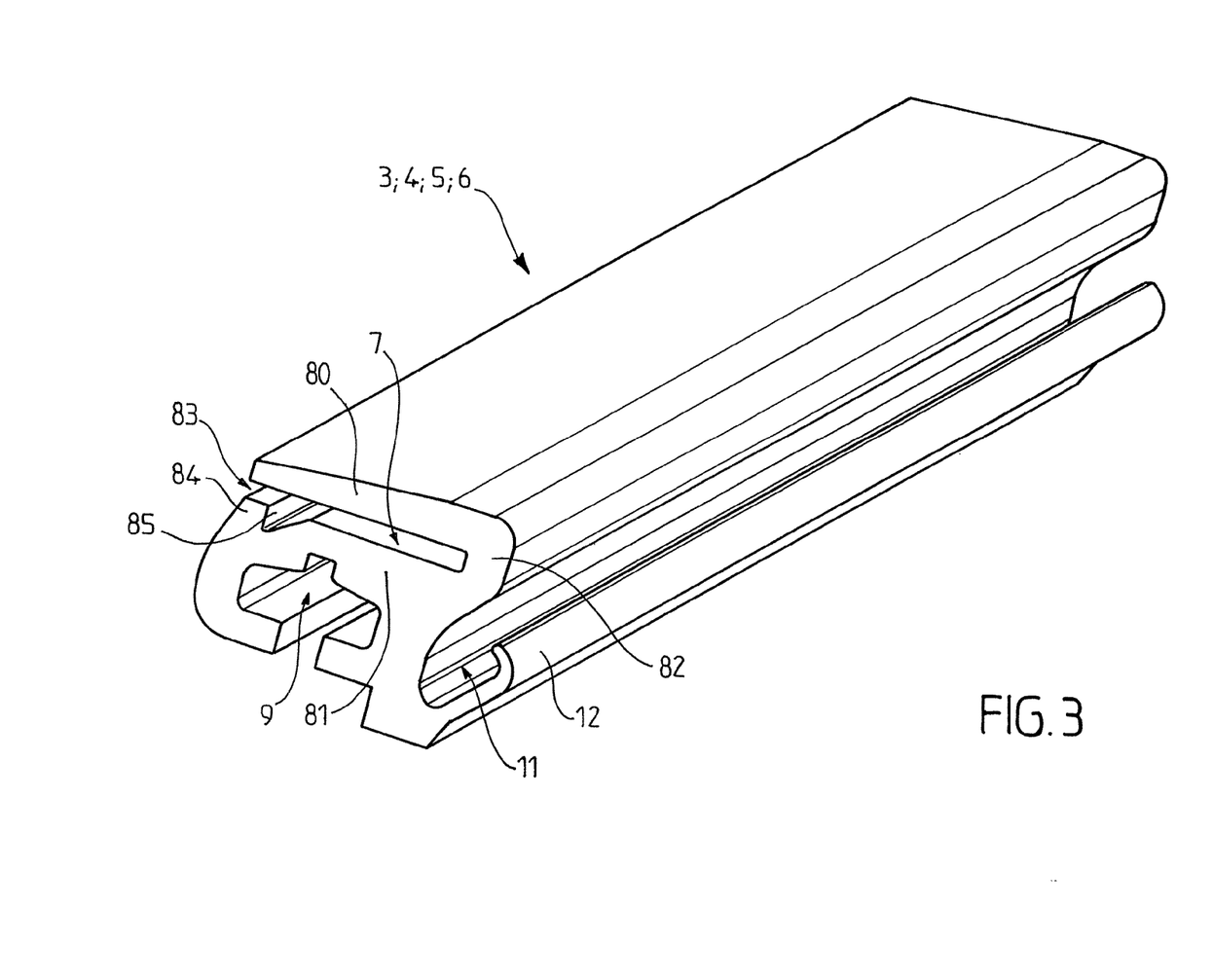
FIG. 3 is a perspective view of an element for maintaining, in the form of a profile made of elastomeric material.
Figure 4:
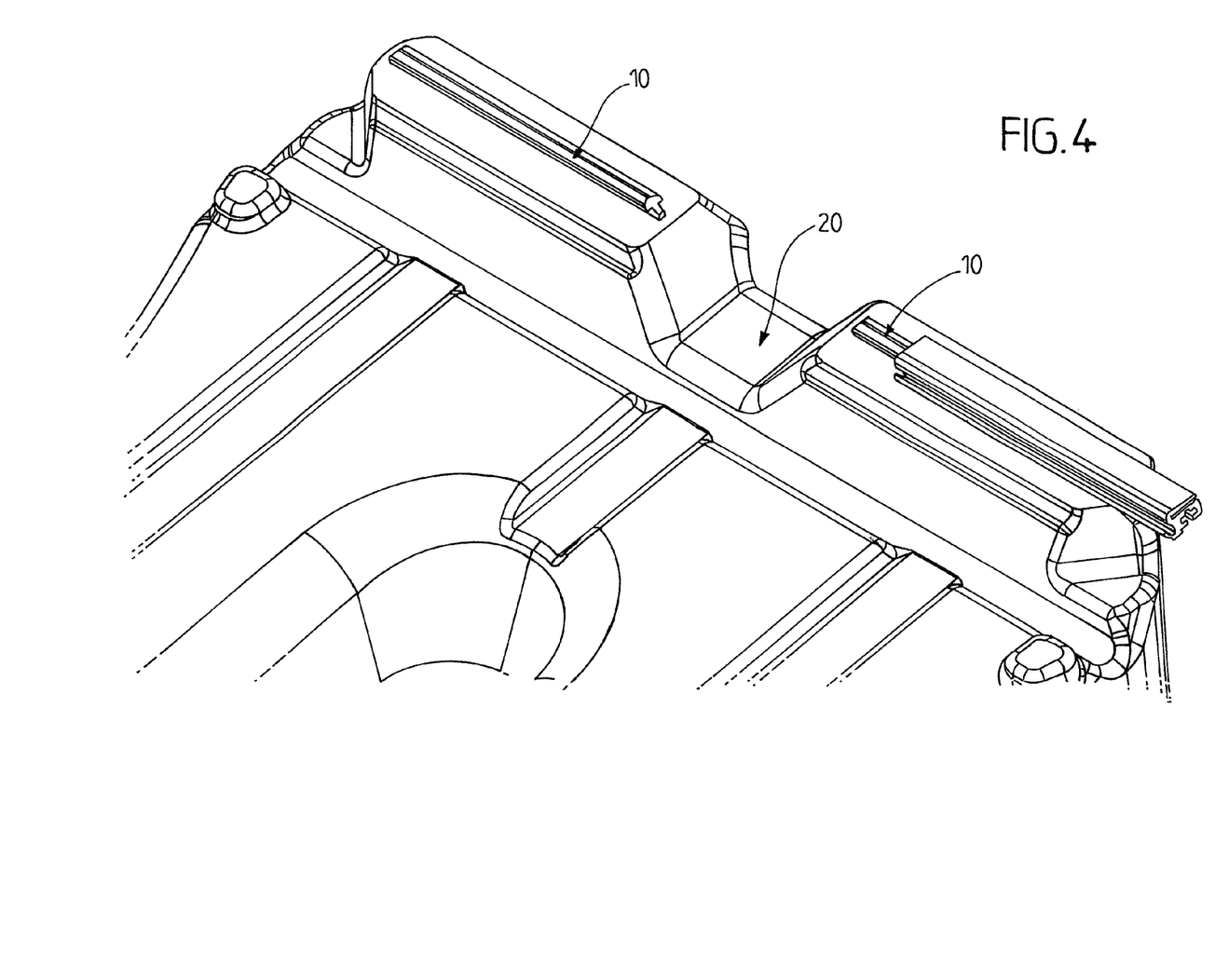
FIG. 4 is a perspective view, according to a non-restricted embodiment, showing the attaching by nesting of the profile of FIG. 3 onto a support.
Figure 5:
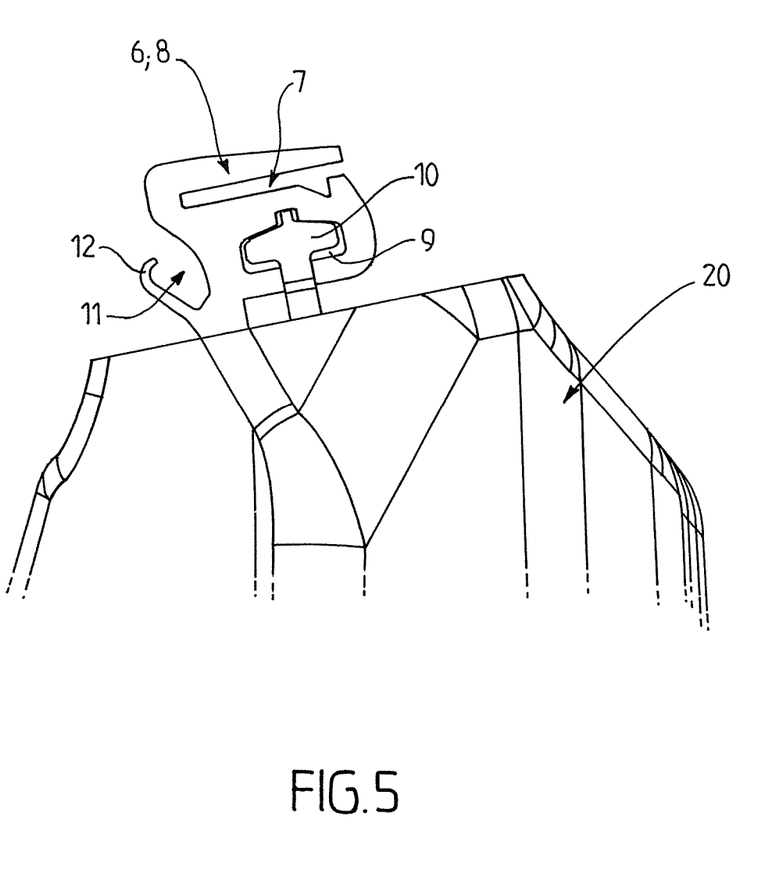
FIG. 5 is a cross-section view of FIG. 4.

More particularly and such as shown in FIG. 3, the profile 8 made of said synthetic material comprises said slot 7, longitudinal to the profile, intended for the maintaining of the photovoltaic panel P or of its frame C. This slot 7 is defined between an upper wing 80, in particular elastic of the profile 8 and the body 81 of the profile 8, with the upper wing 80 and the body 81 being adjoining between them by a junction portion 82 of the profile 8.

This slot 7 makes it possible to maintain the photovoltaic panel P or its frame C, taken between the upper wing 80, elastic, and the body 81. This profile 8 can have on the opening 83 of the slot 7, a tooth 84 with an anti-return function, intended to increase the friction in the direction of the removal of the panel. This tooth 84 is in particular materialised by means of a groove 85 of triangular shape, in depth in the body 81 on the lower wall of the slot 7.

Such as shown in FIG. 3, the profile 8 can also have the fixing groove 9, in particular with a T-shaped section, opening under the lower portion of the profile 8 intended for the attaching by nesting of the profile on a rib 10 of complementary section. The profile can further have the groove 11 with a cable passing function, laterally to the profile, on the side opposite said slot 7, formed between said flexible wing 12 and the body 81 of the profile.

Figure 6:
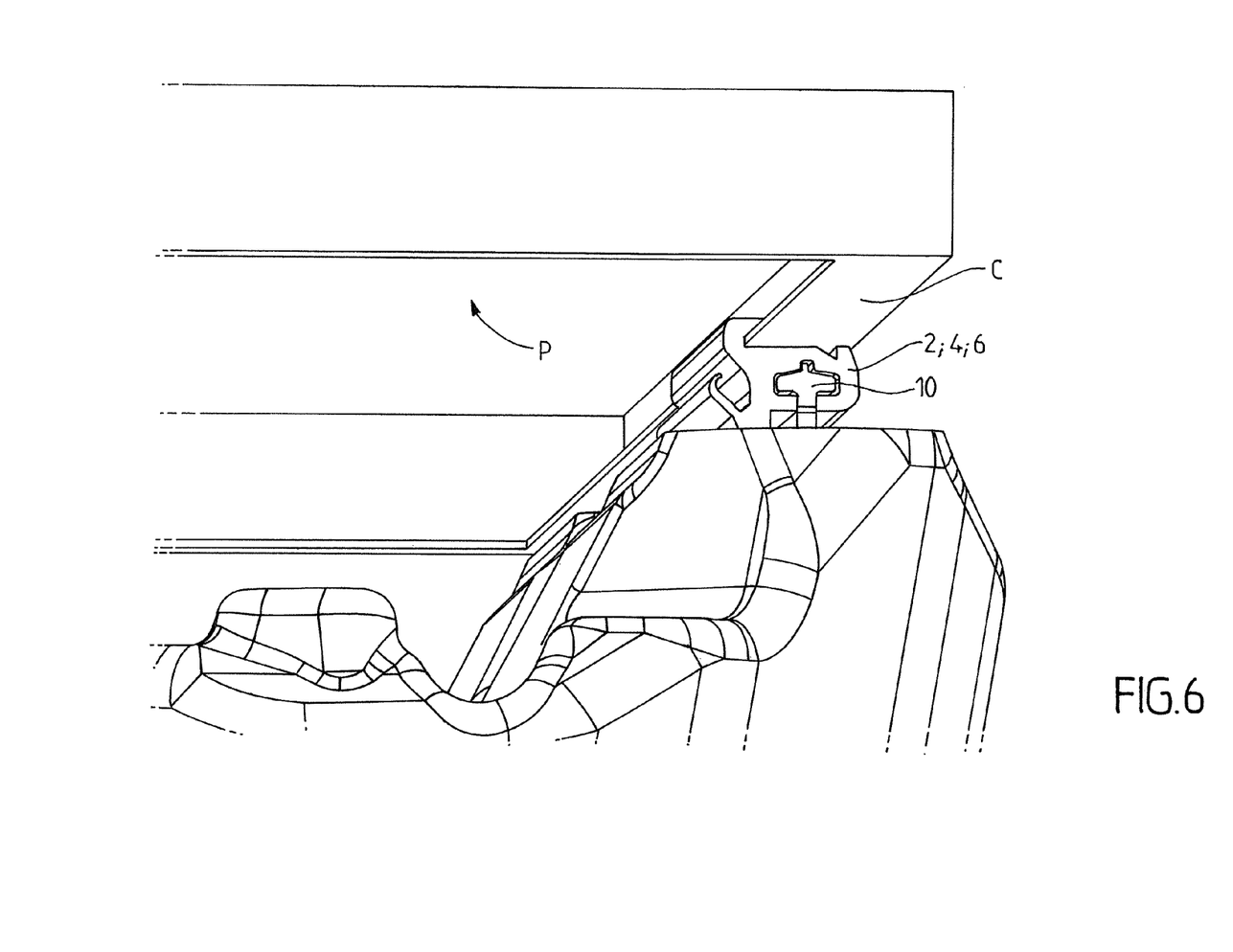
FIG. 6 shows the engagement of the profile of FIG. 5 with the frame of a photovoltaic panel.
Figure 7:
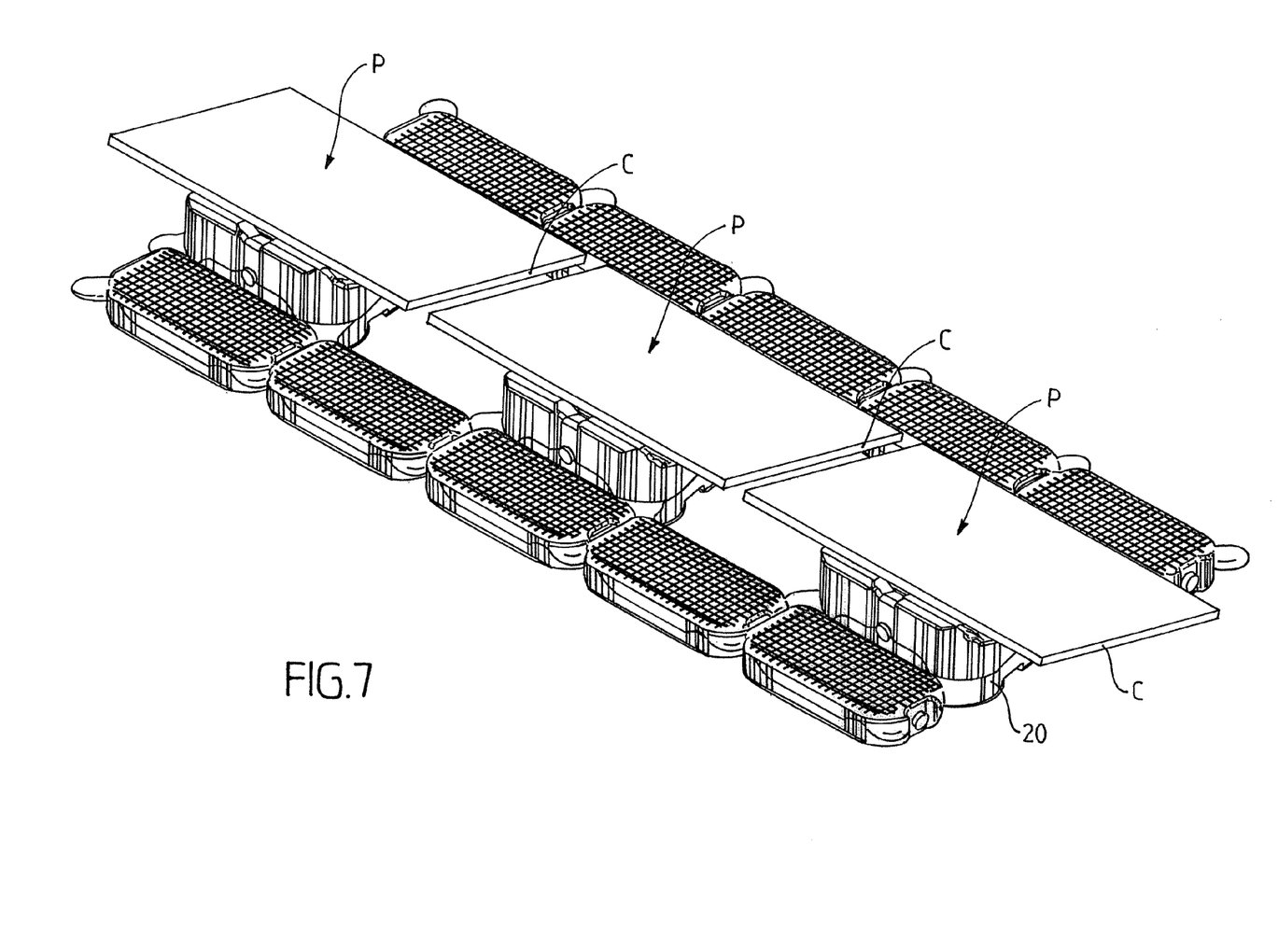
FIG. 7 shows the attaching of photovoltaic panels onto a solar power plant and by the intermediary of devices according to the invention.

Advantageously, and according to the invention, the means for maintaining engage solely with two of the opposite edges of the photovoltaic panel P (or two parallel wings of the frame C of a framed photovoltaic panel) and in such a way that the photovoltaic panel can be provided as extending beyond said means for maintaining 2 (i.e. of the elements 3, 4; 5, 6; 5', 6') in a direction parallel to said slots, such as shown according to a non-restricted example in FIG. 6.

As such, the dimension of the photovoltaic panel according to the direction of the edges maintained is not a mounting constraint.

Advantageously, the depth of the slots 7 of the elements for maintaining 3, 4; 5, 6; 5', 6' can be overabundant, according to a direction parallel to the photovoltaic panel and perpendicular to the clamped edges of the photovoltaic panel.

This disposition makes it possible to take into account changes in the dimension of the panel and/or of the support due to dilatation phenomena, preventing as such the panel (or its frame) from abutting against the bottoms 70 of the two slots 7.

According to an embodiment shown in FIGS. 9 to 12, the or each element 5' or 6' comprises a profile 85 and an elastomeric strip 86, said profile 85 being provided with a channel 87, open laterally, receiving said elastomeric strip 86, said channel 27 provided with said elastomeric strip 86 constituting the slot 7 of said element.

The profile 85 can be made of metal, for example of aluminium or other. The channel 87 of the profile 85 is defined between an upper wing 88 of the profile adjoining the body of the profile 85 by a junction wing 89.

The profile 85 can also have the fixing groove 9, in particular with a T-shaped section, opening under the lower portion of the profile 85 intended for the attaching by nesting of the profile on a rib 10 of complementary section. The profile can again have the groove 11 with a cable passing function, laterally to the profile, on the side opposite said slot 7, formed between a wing 12' and the body of the profile 85.

During the installation, a framed photovoltaic panel can be fastened onto a support according to the following steps:
setting in place of two parallel wings of the frame C of the photovoltaic panel P into the channels 87 of the profiles 85 of said elements 5', 6' and fastening of the profiles 85 of the elements onto the support,
blocking of the photovoltaic panel P in the channels 87 via forced insertion of elastomeric strips 86 into the channels 87.

The fastening of the profiles 85 to the support can be carried out by inserting a fixing rib of the support into the fixing groove 9 of the profile. Possibly a fixing screw can be used to block the position of the profile according to the axis of the rib, with the screw simultaneously passing through the profile and the rib.

The step of inserting the elastomeric strip 86 into the channel 87 can be carried out by hand, assisted by a tool such as a screwdriver.

The elastomeric strip 86 once inserted is in contact, via one of its faces, with an inner wall of the channel 87 of the profile 85, and via the other of its faces with the wing of the frame of the photovoltaic panel P. The elastomeric strip 86 provides as such the blocking of the panel according to the axis of the slots 7 thanks to the friction created.

The device in accordance with the invention will have a particular application in all technical solutions wherein it is necessary to attach a photovoltaic panel onto a support, whether on a roof, on a floating power plant or other.

The invention also relates to a unit comprising a photovoltaic panel and a device for attaching in accordance with the invention, said device providing the maintaining of the photovoltaic panel.

For example, according to an embodiment shown in FIG. 3, the elements are synthetic, and more particularly profiles 8 of a single part made of elastomeric material.

Naturally, other embodiments could have been considered by those skilled in the art without however leaving the scope of the invention such as defined by the claims hereinafter.

NOMENCLATURE

1 Device for attaching,
2 Means for maintaining, 3, 4, 5, 6 Synthetic elements,
5', 6' Elements,
7 Slot,
8 Profile,
9 Fixing groove,
10 Complementary rib (Fixing groove 9),
11 Cable passing groove,
12 Flexible wing (groove 11 profile 8),
12' Wing (groove 11 profile 85),
20 Support,
70 Bottom (slot 7),
80 Upper wing (profile 8),
81 Body (profile 8),
82 Junction portion,
83 Opening,
84 Tooth,
85 Profile,
86 Elastomeric strip,
87 Channel (Profile 85),
88 Upper wing (Profile 85),
89 Junction wing (Profile 85),
P Photovoltaic panel,
C Frame (photovoltaic panel).

The invention claimed is:

1. A device (1) for attaching a framed photovoltaic panel, comprising:
   elements (5', 6'), said elements (5', 6') being engaged with two parallel wings of the frame of the framed photovoltaic panel (P),
   each of said elements (5', 6') comprising:
   a profile (85) of metal being provided with a channel (87), the channel (87) being defined between an upper wing (88) of the profile (85) adjoining a body of the profile (85) by a junction wing (89) of said profile (85), the channel (87) being open laterally,
   an elastomeric strip (86) being positioned within the channel (87) of the profile (85) and forming a slot (7) extending along an axis, the slot (7) being configured to receive a wing of the frame (C) of the framed photovoltaic panel (P), the slot (7) being turned outwards so that the slot (7) is able to maintain the frame (C) of the framed photovoltaic panel (P) on the two parallel wings of the frame (C) and prevent movement of the framed photovoltaic panel (P) in a direction perpendicular to the framed photovoltaic panel (P) and in a direction parallel to a plane of the framed photovoltaic panel (P) and perpendicular to the axis of the slot (7),
   wherein movement of the framed photovoltaic panel (P) is prevented in the direction perpendicular to the axis of the slot (7) solely by an elastic clamping and friction between the elastomeric material of said elastomeric strip (86) and the frame (C) of the framed photovoltaic panel (P) upon insertion of the frame (C) into the slot (7), wherein one face of the elastomeric strip (86) contacts an inner wall of the channel (87) of the metallic profile (85) and another face of the elastomeric strip (86) contacts the wing of the frame of the framed photovoltaic panel (P) such that the elastomeric strip (86) prevents the movement of the framed photovoltaic panel (P) in the direction of the axis of the slot (7) due to friction, and
   wherein said elements (5',6') are arranged to engage with the two wings of the frame of the framed photovoltaic panel (P) and so that that the framed photovoltaic panel (P) extends beyond said elements (5',6') in the direction of the axis of the slot (7).

2. An assembly comprising:
   the device according to claim 1, and
   a support comprising a rib (10) extending along an axis,
   wherein each of said elements (5',6') of said device is fixed to said support, and
   wherein the profiles (85) of said elements (5',6') have a fixing groove (9) having an axis, the axis of the slot (7) and the axis of the fixing groove (9) being parallel to each other, the fixing groove (9) opening under a lower portion of the profile (85) for attaching by nesting of the profile (85) on said rib (10) of a complementary section with said fixing groove (9).

3. The assembly according to claim 2, wherein the fixing groove (9) has a T-shaped section.

4. The assembly according to claim 2, wherein a fixing screw is used to block the position of the profile (85) along the axis of the rib (10), with the screw simultaneously passing through the profile (85) and the rib (10).

5. A method for installing the framed photovoltaic panel (P) on a support using the device of claim 1, comprising the following steps:
   setting in place the two parallel wings of the frame of the framed photovoltaic panel (P) into the channels of the profiles of said elements and fastening of the profiles of said elements onto the support,
   preventing movement of the framed photovoltaic panel (P) in the channels via insertion of the elastomeric strips into the channels.

* * * * *